(12) United States Patent
Miyajima et al.

(10) Patent No.: US 8,224,526 B2
(45) Date of Patent: Jul. 17, 2012

(54) VEHICLE STABILIZATION CONTROL DEVICE

(75) Inventors: Takayuki Miyajima, Anjo (JP);
Yoshiyuki Yasui, Nagoya (JP);
Toshihisa Kato, Nagoya (JP)

(73) Assignee: Aisin AW Co., Ltd. (JP)

( * ) Notice: Subject to any disclaimer, the term of this patent is extended or adjusted under 35 U.S.C. 154(b) by 427 days.

(21) Appl. No.: 12/570,722

(22) Filed: Sep. 30, 2009

(65) Prior Publication Data

US 2010/0106374 A1    Apr. 29, 2010

(30) Foreign Application Priority Data

Oct. 28, 2008 (JP) ................................ 2008-277467

(51) Int. Cl.
*B60W 30/02* (2006.01)
*B62D 6/00* (2006.01)
*G06F 7/00* (2006.01)
(52) U.S. Cl. .............................. 701/41; 701/70; 340/441
(58) Field of Classification Search .................. 701/41, 701/70, 72, 45, 93; 340/441, 438, 425
See application file for complete search history.

(56) References Cited

U.S. PATENT DOCUMENTS

| | | | | |
|---|---|---|---|---|
| 5,757,949 A | * | 5/1998 | Kinoshita et al. | 382/104 |
| 5,978,731 A | * | 11/1999 | Matsuda | 701/93 |
| 6,188,316 B1 | | 2/2001 | Matsuno et al. | |
| 6,392,535 B1 | * | 5/2002 | Matsuno et al. | 340/441 |
| 6,401,023 B1 | * | 6/2002 | Takahashi | 701/70 |
| 2001/0018641 A1 | * | 8/2001 | Kodaka et al. | 701/301 |
| 2001/0037173 A1 | * | 11/2001 | Sekine | 701/200 |
| 2005/0102085 A1 | | 5/2005 | Sakata | |
| 2005/0216164 A1 | | 9/2005 | Sakata | |
| 2005/0240334 A1 | * | 10/2005 | Matsumoto et al. | 701/93 |
| 2006/0041366 A1 | | 2/2006 | Kato et al. | 701/72 |
| 2007/0106445 A1 | | 5/2007 | Suzuki et al. | |
| 2008/0024266 A1 | | 1/2008 | Sekine | |

FOREIGN PATENT DOCUMENTS

JP    2004-066940    3/2004

* cited by examiner

*Primary Examiner* — Tan Q Nguyen
(74) *Attorney, Agent, or Firm* — Bacon and Thomas, PLLC

(57) ABSTRACT

A vehicle stabilization control device includes: an actual turning state quantity acquisition unit that acquires an actual turning state quantity indicating an actual turning state of a vehicle; a curve information acquisition unit that acquires the shape of a curve ahead of the vehicle; a vehicle speed acquisition unit that acquires speed of the vehicle; and a curve traverse possibility determination unit that determines a possibility that the vehicle can stably traverse the curve, based on the curve shape and speed of the vehicle; a control quantity computation unit that, to control braking force on each wheel and suppress understeering, computes a target control quantity for each wheel, based on the actual turning state quantity and on the possibility that the vehicle can stably traverse the curve; and a control unit controlling the braking force for each wheel, based on the target control quantity for each wheel.

11 Claims, 10 Drawing Sheets

VEHICLE STABILIZATION CONTROL DEVICE

INCORPORATION BY REFERENCE

The disclosure of Japanese Patent Application No. 2008-277467 filed on Oct. 28, 2008, including the specification, drawings and abstract is incorporated herein by reference in its entirety.

BACKGROUND OF THE INVENTION

1. Field of the Invention

The present invention relates to a vehicle stabilization control device, specifically a device that controls the braking force that is applied to each wheel in order to suppress understeer of the vehicle.

2. Description of the Related Art

Vehicle stabilization control devices (understeer suppression control devices) are widely known that perform understeer suppression control that, in a case where a vehicle is traveling through a curve and the degree of understeer of the vehicle exceeds a threshold value, controls the braking force that is applied to each wheel such that the vehicle decelerates and/or a yaw moment is generated in a direction that suppresses the understeer (refer to Japanese Patent Application Publication No. JP-A-2004-66940, for example).

SUMMARY OF THE INVENTION

In understeer suppression control, the characteristics of the braking force that is applied to each wheel with respect to the degree of the understeer (specifically, the threshold value itself, the increase in the braking force that is applied to each wheel in relation to the increase in the degree of the understeer, prioritizing of the vehicle deceleration and the imparting of the yaw moment, and the like) are determined through various types of experiments, simulations, and the like based on assumptions regarding various types of circumstances. In most cases, the characteristics of the braking force that is applied to each wheel with respect to the degree of the understeer are a standard set of characteristics (ordinary characteristics).

Incidentally, if curve information (about the shape of a curve) that is based on map information in a navigation device is utilized around the time that the vehicle enters a curve, the possibility that the vehicle will traverse the curve in a stable manner can be determined based on the shape of the curve and the current vehicle speed.

In a case where the determination predicts in advance that the vehicle cannot traverse the curve in a stable manner, or that the possibility of traveling through the curve is low, it is preferable for the vehicle to decelerate promptly. It is conceivable that, in order for the deceleration to be achieved by the understeer suppression control, it would be preferable for the ordinary characteristics of the braking force that is applied to each wheel with respect to the degree of the understeer to be replaced with characteristics that will cause the control to start sooner and/or characteristics that will place a higher priority on vehicle deceleration than on the imparting of the yaw moment.

The present invention provides a vehicle stabilization control device that implements the understeer suppression control that can effectively decelerate the vehicle in a case where it is predicted that the vehicle cannot traverse the curve in a stable manner.

The vehicle stabilization control device according to the present invention includes an actual turning state quantity acquisition unit, a control quantity computation unit, and a control unit. The actual turning state quantity acquisition unit acquires actual turning state quantities that indicate an actual turning state of a vehicle. In order to control a braking force for each of the wheels of the vehicle such that understeer of the vehicle can be suppressed, the control quantity computation unit computes a target control quantity for each of the wheels, based on the actual turning state quantities. The control unit controls the braking force for each of the wheels, based on the target control quantity for each of the wheels The vehicle stabilization control device according to the present invention also includes a curve information acquisition unit, a vehicle speed acquisition unit, and a curve traverse possibility determination unit. The curve information acquisition unit acquires a shape of a curve that lies ahead in the direction of travel of the vehicle. The vehicle speed acquisition unit acquires a speed of the vehicle. The curve traverse possibility determination unit determines a possibility that the vehicle can traverse the curve in a stable manner, based on the curve shape and the speed of the vehicle. The determination can be made around the time that the vehicle enters the curve from a straight road (around the time that the vehicle passes an entrance to the curve).

Here, the curve traverse possibility determination unit may also be configured so as to compute a lateral acceleration that acts on the vehicle based on the curve shape and the speed of the vehicle, and to determine the possibility that the vehicle can traverse the curve in a stable manner based on the lateral acceleration. In the computation of the lateral acceleration, the current vehicle speed may be used as the speed of the vehicle, and the minimum radius of curvature within the curve may be used as the curve shape.

In this case, it is specifically preferable for the curve traverse possibility determination unit to be configured so as to determine that the vehicle can traverse the curve in a stable manner in a case where the computed lateral acceleration is not greater than a first specified value, and in a case where the computed lateral acceleration is greater than the first specified value the possibility that the vehicle can traverse the curve in a stable manner becomes lower to the extent that the deviation between the computed lateral acceleration and the first specified value becomes greater, and that the vehicle cannot traverse the curve in a stable manner in a case where the computed lateral acceleration is not less than a second specified value that is greater than the first specified value.

The curve traverse possibility determination unit may also be configured so as to determine that the vehicle can traverse the curve in a stable manner in a case where the computed lateral acceleration is not greater than a third specified value, and that the vehicle cannot traverse the curve in a stable manner in a case where the computed lateral acceleration is greater than the third specified value.

Further, in a case where the curve information acquisition unit may be configured such that it acquires a position within the curve that corresponds to the curve shape, the vehicle stabilization control device may also include a vehicle position acquisition unit that acquires a position of the vehicle and may also include a target vehicle speed computation unit that computes a target vehicle speed for the vehicle to traverse the curve in a stable manner, based on the position that corresponds to the curve shape, the curve shape, and the vehicle position. In this case, the curve traverse possibility determination unit may also be configured so as to determine the possibility that the vehicle can traverse the curve in a stable manner based on a result of a comparison of the target vehicle speed and the speed of the vehicle.

In this case, it is specifically preferable for the curve traverse possibility determination unit to be configured so as to determine that the vehicle can traverse the curve in a stable manner in a case where a vehicle speed deviation that is computed by subtracting the target vehicle speed from the speed of the vehicle is not greater than a fourth specified value, and in a case where the vehicle speed deviation is greater than the fourth specified value the possibility that the vehicle can traverse the curve in a stable manner becomes lower to the extent that the vehicle speed deviation becomes greater, and that the vehicle cannot traverse the curve in a stable manner in a case where the vehicle speed deviation is not less than a fifth specified value that is greater than the fourth specified value.

The curve traverse possibility determination unit may also be configured so as to determine that the vehicle can traverse the curve in a stable manner in a case where the vehicle speed deviation that is computed by subtracting the target vehicle speed from the speed of the vehicle is not greater than a sixth specified value, and that the vehicle cannot traverse the curve in a stable manner in a case where the vehicle speed deviation is greater than the sixth specified value.

A feature of the vehicle stabilization control device according to the present invention is that the control quantity computation unit is configured so as to adjust the target control quantity for each of the wheels in accordance with the possibility that the vehicle can traverse the curve in a stable manner. This makes it possible to utilize the understeer suppression control to decelerate the vehicle effectively in a case where it can be predicted that the vehicle cannot traverse the curve in a stable manner and in a case where the possibility that the vehicle can traverse the curve is low.

Specifically, the vehicle stabilization control device may also include, for example, a steering angle acquisition unit, a target turning state quantity computation unit, and a steering characteristics computation unit. The steering angle acquisition unit acquires a value that is equivalent to a steering angle of a steering control wheel of the vehicle. The target turning state quantity computation unit that computes, based on the speed of the vehicle and the value that is equivalent to the steering angle, a target turning state quantity that corresponds to the actual turning state quantity. The steering characteristics computation unit, by comparing the target turning state quantity and the actual turning state quantity, computes a steering characteristic value that indicates a steering characteristic of the vehicle. The control quantity computation unit may also be configured so as to compute the target control quantity for each of the wheels to be zero in a case where the steering characteristic value is not greater than a threshold value, and the target control quantity for each of the wheels to be greater than zero in a case where the steering characteristic value is greater than the threshold value. In this case, the control quantity computation unit may also be configured so as to compute the threshold value to be lower as the possibility that the vehicle can traverse the curve in a stable manner is lower.

This means that the understeer suppression control becomes more likely to start to the extent that the possibility that the vehicle can traverse the curve in a stable manner is low, which means that the understeer suppression control will be started promptly. This makes it possible to utilize the understeer suppression control to decelerate the vehicle effectively.

It is also preferable for the control quantity computation unit to be configured so as to provide a first computation characteristic and a second computation characteristic for the computation of the target control quantity for each of the wheels, the first computation characteristic giving higher priority to an imparting of a yaw moment to the vehicle than to the deceleration of the vehicle and the second computation characteristic giving higher priority to the deceleration of the vehicle than to the imparting of the yaw moment to the vehicle. It is also preferable for the control quantity computation unit to be configured so as to compute the target control quantity for each of the wheels using the first computation characteristic in a case where the possibility that the vehicle can traverse the curve in a stable manner is high (and in a case where it is determined that the vehicle can traverse the curve in a stable manner). It is also preferable for the control quantity computation unit to be configured so as to compute the target control quantity for each of the wheels using the second computation characteristic in a case where the possibility that the vehicle can traverse the curve in a stable manner is low (and in a case where it is determined that the vehicle cannot traverse the curve in a stable manner).

Thus, in a case where it is determined that the possibility that the vehicle can traverse the curve in a stable manner is low (and in a case where it is determined that the vehicle cannot traverse the curve in a stable manner), the understeer suppression control is performed using the characteristic that gives higher priority to the deceleration of the vehicle than to the imparting of the yaw moment to the vehicle. This makes it possible to utilize the understeer suppression control to decelerate the vehicle effectively.

DETAILED DESCRIPTION OF THE EMBODIMENTS

Hereinafter, embodiments of a vehicle stabilization control device according to the present invention will be explained with reference to the drawings.

Configuration

Figure 1:
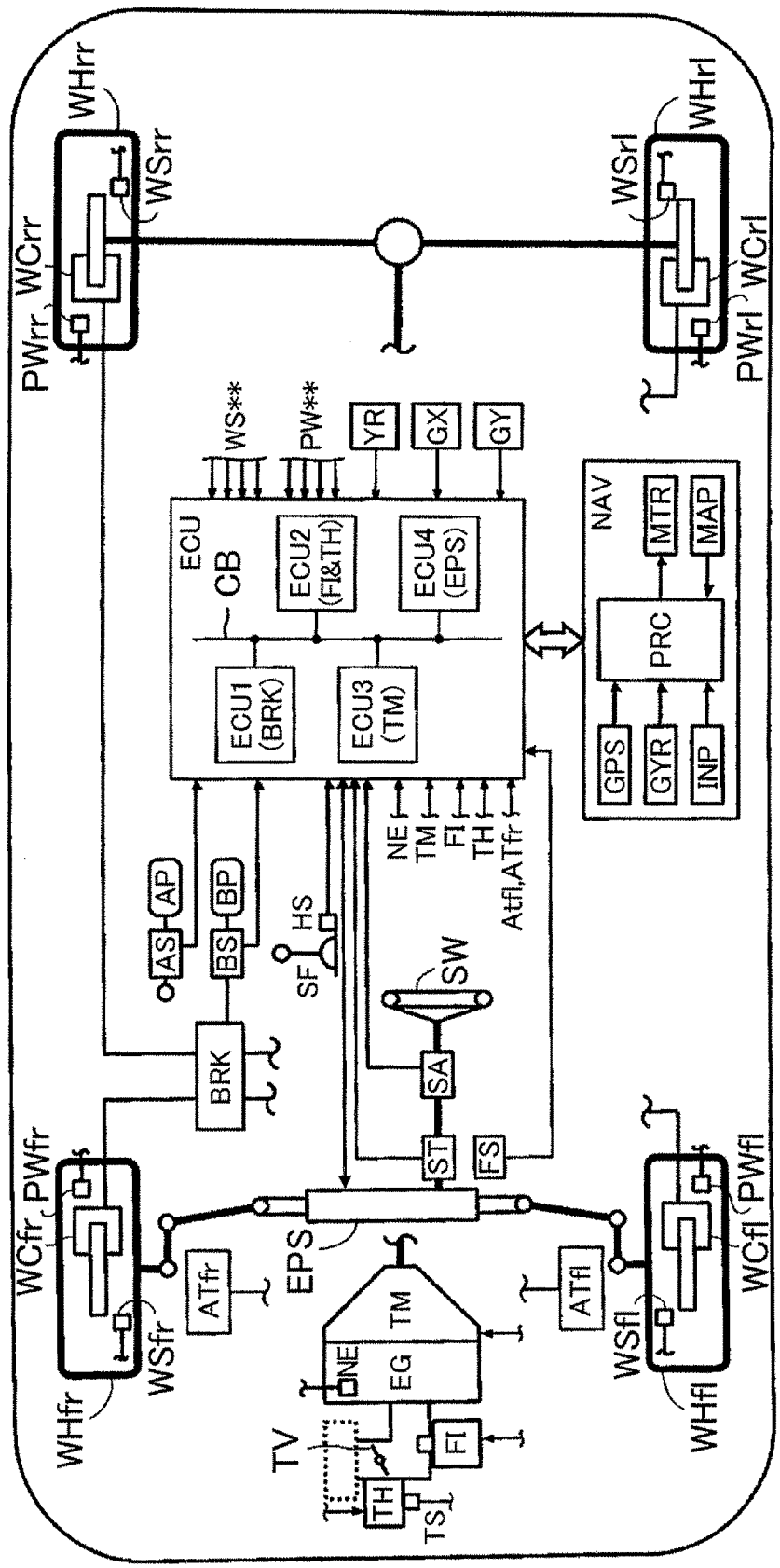
FIG. 1 is a schematic configuration diagram of a vehicle in which is mounted a vehicle stabilization control device according to an embodiment of the present invention.

FIG. 1 shows a schematic configuration of a vehicle in which is mounted a vehicle stabilization control device (hereinafter called "the present device") according to an embodiment of the present invention. The present device is provided with an engine EG that is the power source for the vehicle, an automatic transmission TM, a brake actuator BRK, an electronic control unit ECU, and a navigation device NAV.

The engine EG is an internal combustion engine, for example. That is, an opening angle of a throttle valve TV is regulated by a throttle actuator TH in accordance with an operation of an accelerator pedal (an accelerator operating member) AP by a driver. An amount of fuel that is in accordance with an amount of intake air that is regulated in accordance with the opening angle of the throttle valve TV is injected by a fuel injection actuator (an injector) FI. An output torque is thus produced in accordance with the operation of the accelerator pedal AP by the driver.

The automatic transmission TM is one of a multi-stage automatic transmission that has a plurality of shift speeds and a continuously variable automatic transmission that does not have shift speeds. The automatic transmission TM is capable of varying a reduction gear ratio (the ratio of a revolution speed of an EG output shaft (a TM input shaft) to a revolution speed of a TM output shaft) in accordance with an operating state of the engine EG and a position of a shift lever (a shift operating member) SF automatically (without an operation of the shift lever SF by the driver).

The brake actuator BRK has a known configuration that includes a plurality of electromagnetic valves, a hydraulic pump, a motor, and the like. When vehicle stabilization control is not being performed, the brake actuator BRK supplies a braking pressure (a brake hydraulic pressure) to wheel cylinders WC of wheels WH in accordance with an operation of a brake pedal (a braking operating member) BP by the driver. When vehicle stabilization control is being performed, the brake actuator BRK can regulate the braking pressure within each of the wheel cylinders WC** separately for each of the wheels, independently of the operation of the brake pedal BP (and the operation of the accelerator pedal AP).

Note that the "" that is appended to various types of symbols and the like denotes the wheel to which the various types of symbols and the like pertain, with "fl" denoting the left front wheel, "fr" denoting the right front wheel, "rl" denoting the left rear wheel, and "rr" denoting the right rear wheel, For example, "the wheel cylinders WC" collectively indicates a wheel cylinder WCfl for the left front wheel, a wheel cylinder WCfr for the right front wheel, a wheel cylinder WCrl for the left rear wheel, and a wheel cylinder WCrr for the right rear wheel, The present device is also provided with wheel speed sensors WS that detect the wheel speeds of the wheels WH, braking pressure sensors PW that detect the braking pressures within the wheel cylinders WC, a steering wheel sensor SA that detects an angle of a steering wheel SW (in relation to a neutral position), a front wheel steering angle sensor FS that detects a steering angle of the front wheels (the steering control wheels), a yaw rate sensor YR that detects a yaw rate of the vehicle body, a longitudinal acceleration sensor GX that detects a rate of acceleration (a rate of deceleration) in the longitudinal direction of the vehicle body, a lateral acceleration sensor GY that detects a rate of acceleration in the lateral direction of the vehicle body, an engine revolution speed sensor NE that detects the rotational speed of the output shaft of the engine EG, an accelerator operation amount sensor AS that detects an amount of operation of the accelerator pedal (the accelerator operating member) AP, a braking operation amount sensor BS that detects an amount of operation of the brake pedal BP, a shift position sensor HS that detects the position of the shift lever SF, a throttle valve opening angle sensor TS that detects the opening angle of the throttle valve TV, self-aligning torque sensors ATf* that detect self-aligning torques of the steering control wheels (the front wheels), and a steering torque sensor ST that detects a steering torque of the steering wheel SW.

The self-aligning torque sensors ATf* are affixed to the wheel rims of the steering control wheels, for example, and detect the self-aligning torques based on information about the strains of the wheel rims, which the self-aligning torque sensors ATf* detect, and the positions of the wheel rims in which the strains are detected.

The electronic control unit ECU is a microcomputer that electronically controls the power train system and the chassis system. The electronic control unit ECU is electrically connected to the various types of actuators described above, to the various types of sensors described above, and to the automatic transmission TM, and it is capable of communication over a network. The electronic control unit ECU is configured from a plurality of control units (ECU1 to ECU4) that are connected to one another through a communication bus CB.

The ECU1 within the electronic control unit ECU is a wheel brake control unit and performs known braking pressure controls (wheel brake controls), such as a vehicle stabilization control (ESC control), an anti-skid control (ABS control), a traction control (TCS control), and the like, by controlling the brake actuator BRK based on signals from the wheel speed sensors WS, the longitudinal acceleration sensor GX, the lateral acceleration sensor GY, the yaw rate sensor YR, and the like. The ECU1 also computes a vehicle speed Vx based on detection results (wheel speeds Vw) from the wheel speed sensors WS**.

The ECU2 within the electronic control unit ECU is an engine control unit and performs control of the output torque of the engine EG (engine control) by controlling the throttle actuator TH and the fuel injection actuator FT based on signals from the accelerator operation amount sensor AS and the like.

The ECU3 within the electronic control unit ECU is an automatic transmission control unit and performs reduction gear ratio control (transmission control) by controlling the automatic transmission TM based on signals from the shift position sensor HS and the like.

The ECU4 within the electronic control unit ECU is an electric power steering control unit and performs power steering control by controlling an electric power steering device EPS based on signals from the steering torque sensor ST and the like.

The navigation device NAV is provided with a navigation processing device PRC, and the navigation processing device PRC is electrically connected to a vehicle position detection unit (a Global Positioning System device) GPS, a yaw rate gyroscope GYR, and input portion INP, a storage portion MAP, and a display portion (a display) MTR. The navigation device NAV is one of electrically connected to and capable of wireless communication with the electronic control unit ECU.

The vehicle position detection unit GPS is capable of detecting the position (the latitude, the longitude, and the like) of the vehicle by one of the known methods that utilize positioning signals from artificial satellites. The yaw rate gyroscope GYR is capable of detecting the angular velocity (the yaw rate) of the vehicle body. The input portion INP inputs an operation by the driver that is related to the navigation function. The storage portion MAP stores various types of information, such as map information, road information, and the like.

The navigation processing device PRC processes signals from the vehicle position detection unit GPS, the yaw rate gyroscope GYR, the input portion INP, and the storage portion MAP in an integrated manner and displays the results of the processing (information that is related to the navigation function) on the display portion MTR.

Figure 2:
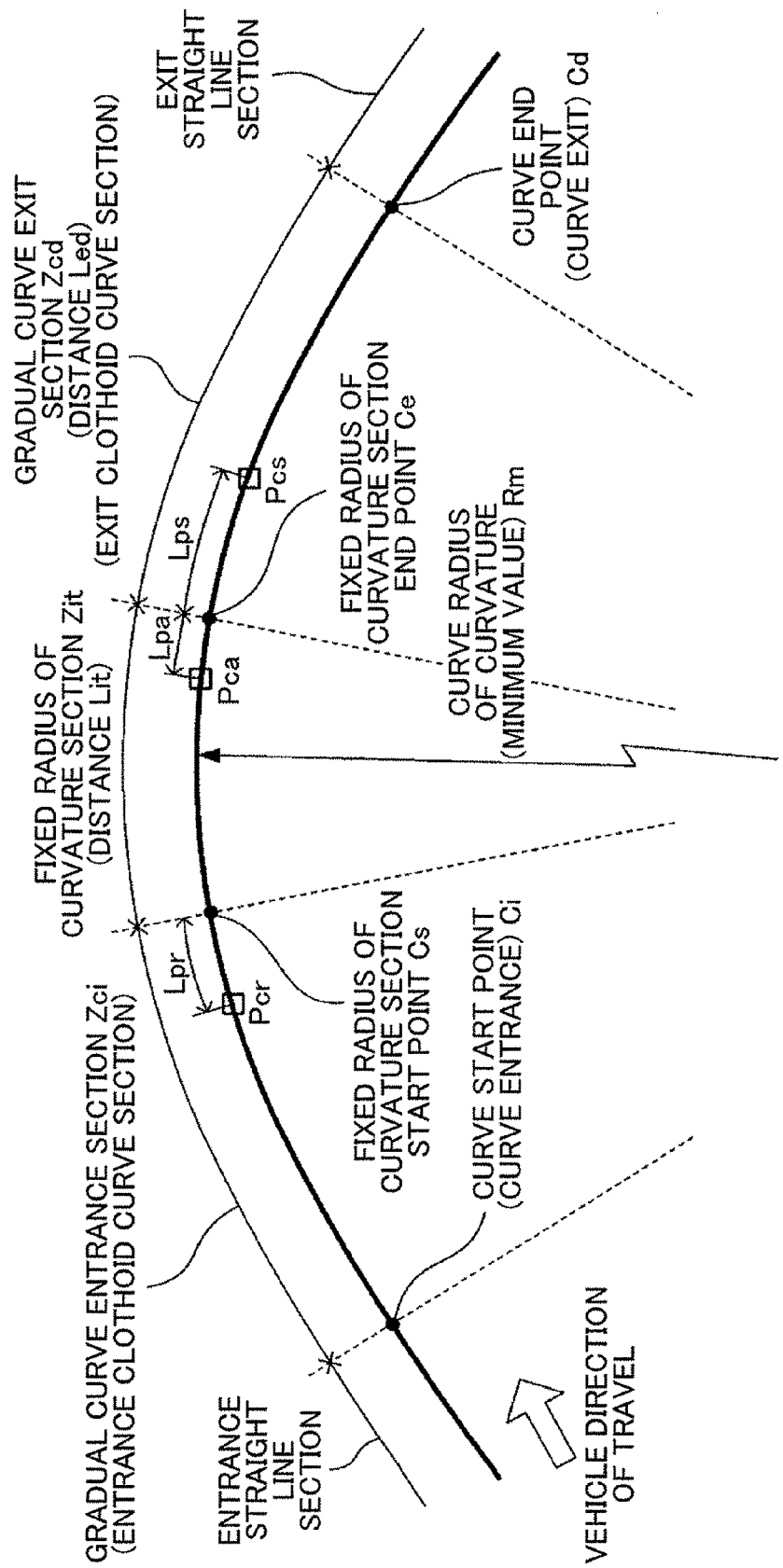
FIG. 2 is a figure that shows an example of a shape of a curve.

The explanation of the present device that is configured as described above continues below with respect to a curve that has a shape like that shown in FIG. 2. The (single) curve that is shown in FIG. 2 is configured, in order from a curve start point (a curve entrance) $Ci$ to a curve end point (a curve exit) $Cd$, from a gradual curve entrance section $Zci$ (in which the radius of curvature gradually becomes smaller as the vehicle advances), a fixed radius of curvature section $Zit$, and a gradual curve exit section $Zcd$ (in which the radius of curvature gradually becomes greater as the vehicle advances). The gradual curves are configured from clothoid curves, for example. The gradual curve sections are provided in order to make it possible for the vehicle to traverse the curve smoothly by having the driver first gradually turn the steering wheel and then gradually return the steering wheel to its original position, without requiring the driver to operate the steering wheel abruptly.

Figure 3:
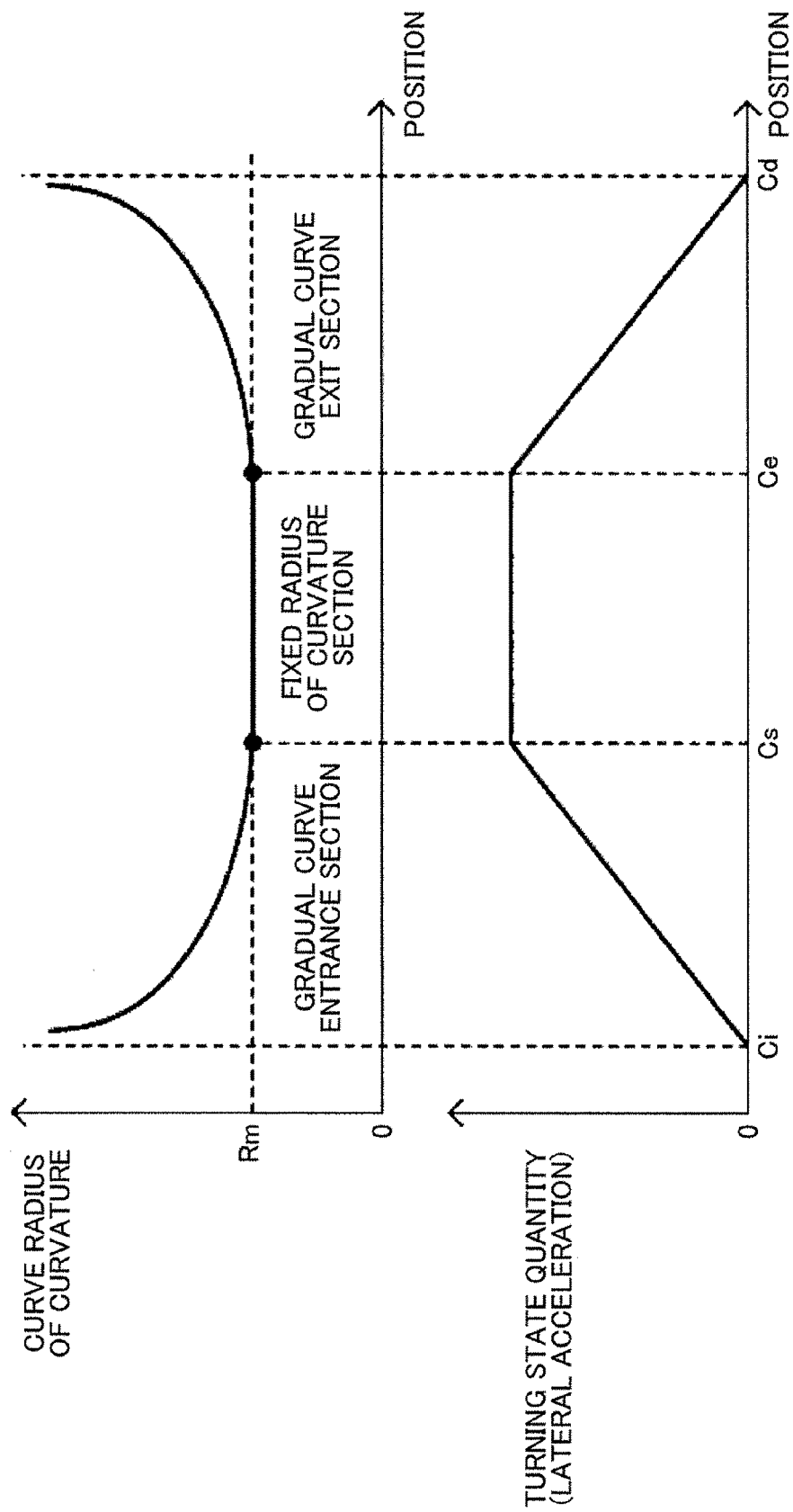
FIG. 3 is a figure that shows an example of a radius of curvature and a turning state quantity for the curve that is shown in FIG. 2.

As shown in FIG. 3, in this curve, the radius of curvature is infinitely large at the curve start point $Ci$ (that is, the end point of a straight road section), then gradually becomes smaller until it reaches $Rm$ (the minimum radius of curvature in the curve) at a start point $Cs$ of the fixed radius of curvature section $Zit$. Thereafter, the radius of curvature is maintained at $Rm$ as far as an end point $Ce$ of the fixed radius of curvature section $Zit$, after which it gradually becomes larger until it becomes infinitely large at the curve end point $Cd$ (that is, the start point of a straight road section). If the vehicle traverses the curve at a fixed vehicle speed, a turning state quantity (for example, lateral acceleration) starts to increase from zero (straight line driving) at the curve start point $Ci$, increases roughly proportionally through the gradual curve entrance section $Zci$, and reaches a fixed value (a maximum value) in the fixed radius of curvature section $Zit$. Thereafter, the turning state quantity decreases roughly proportionally through the gradual curve exit section $Zcd$, and reaches zero (straight line driving) at the curve end point $Cd$.

Consider a case in which the vehicle enters the curve at an excessive speed. The driver gradually increases the steering wheel angle as the vehicle travels through the gradual curve entrance section $Zci$ of the curve. This causes understeer of the vehicle to occur, and the degree of understeer increases. If this causes the vehicle to become unable to trace the gradual curve of the entrance section $Zci$, the driver will turn the steering wheel even farther. This sort of situation tends to occur, not at the curve entrance $Ci$, but close to the start point $Cs$ of the fixed radius of curvature section $Zit$.

Overview of Vehicle Stabilization Control

Figure 4:
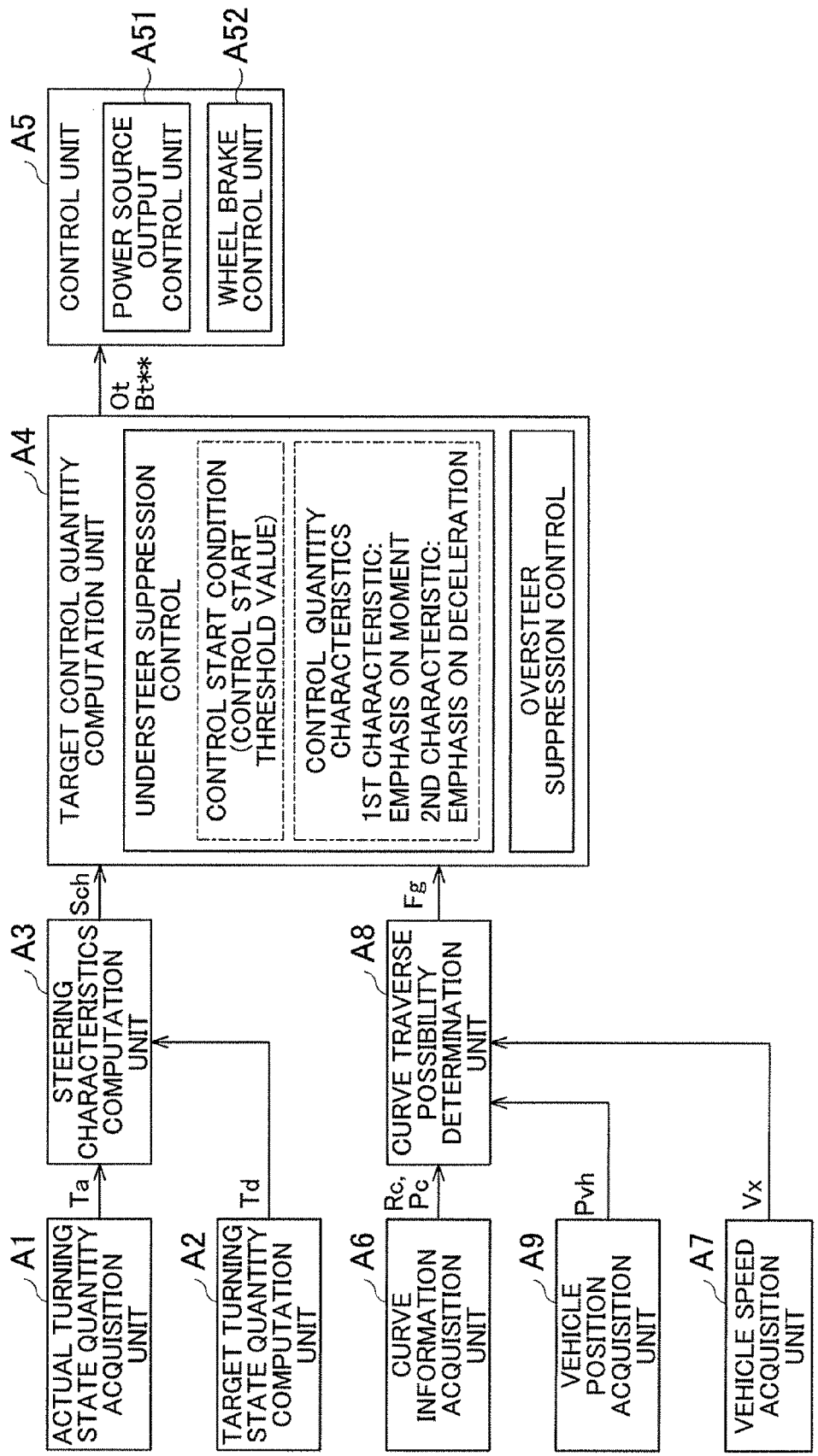
FIG. 4 is a functional block diagram for explaining an overview of stabilization control that is performed by the vehicle stabilization control device that is shown in FIG. 1.

Hereinafter, an overview of vehicle stabilization control by the present device will be explained with reference to FIG. 4.

First, an actual yaw movement state quantity (an actual turning state quantity $Ta$) of the vehicle is acquired by an actual turning state quantity acquisition unit $A1$. The actual turning state quantity $Ta$ is the yaw movement state quantity that actually occurs in relation to the vehicle, such as an actual yaw rate $Yr$, an actual lateral acceleration $Gy$, an actual vehicle body slip angle $\beta a$, or an actual vehicle body slip angular velocity $d\beta a$, for example. A value that is acquired by combining at least two of the above state quantities may also be used for the actual turning state quantity $Ta$.

A yaw movement state quantity (called a target turning state quantity) $Td$ that serves as a target is acquired by a target turning state quantity computation unit $A2$. A value of the same dimension as that of the actual turning state quantity $Ta$ (a target yaw rate $Yrd$, a target lateral acceleration $Gyd$, a target vehicle body slip angle $\beta d$, or a target vehicle body slip angular velocity $d\beta d$) is computed as a target turning state quantity $Td$. The target turning state quantity $Td$ can also be computed based on the vehicle speed $Vx$ and one of a steering wheel angle $\theta sw$ and a front wheel steering angle $\delta f$.

Based on the actual turning state quantity $Ta$ and the target turning state quantity $Td$, a steering characteristics computation unit $A3$ computes individual steering characteristics (understeer, neutral steer, and oversteer) of the vehicle and computes a computation result (a steering characteristic value) $Sch$. The steering characteristic value $Sch$ is a value that expresses a measure of the vehicle's steering characteristics, and it can be computed by comparing the target turning state quantity $Td$ and the actual turning state quantity $Ta$. The deviation between $Td$ and $Ta$ ($Td-Ta$) can be used as the steering characteristic value $Sch$. In the present embodiment, the steering characteristic value $Sch$ can be computed without using the target turning state quantity $Td$. For example, the steering characteristic value $Sch$ can be computed based on the actual vehicle body slip angular velocity $d\beta a$, the actual vehicle body slip angle $\beta a$, and the like.

Based on the steering characteristic value $Sch$, a target control quantity computation unit $A4$ computes target control quantities $Bt^{}$ for the braking forces that are applied to the individual wheels in order to suppress understeer and oversteer of the vehicle and also computes a target output power $Ot$ for the output of the power source (the engine EG or the like). The target control quantity computation unit $A4$ adjusts the target control quantities $Bt^{}$ based on a determination result $Fg$ (hereinafter also called a determination value $Fg$) that will be described later. The target control quantity computation unit $A4$ includes an understeer suppression control block that suppresses understeer and an oversteer suppression control block that suppresses oversteer.

Based on the steering characteristic value $Sch$, the understeer suppression control block sets a control start condition (a control start threshold value $Kj$) for starting an understeer suppression control. The threshold value $Kj$ is adjusted based on the determination result $Fg$, which is determined by a curve traverse possibility determination unit $A8$ that will be described later. In a case where the determination result $Fg$ is that it is possible for the vehicle to traverse the curve (the determination result $Fg$ is one of zero and a relatively small value), the threshold value $Kj$ is set to a large value, making it less likely that the understeer suppression control will be started. On the other hand, in a case where the determination result $Fg$ is that it is not possible for the vehicle to traverse the curve (the determination result $Fg$ is one of one and a relatively large value), the threshold value $Kj$ is adjusted to a small value, such that the understeer suppression control will be started by a small value for the steering characteristic value Sch. This makes it more likely that the understeer suppression control will be started.

Further, for the computation of the target control quantities Bt by the target control quantity computation unit A4, which is based on the steering characteristic value Sch, two types of characteristics are provided. A first characteristic (a characteristic for computing target control quantities Bm) gives more weight to a yaw characteristic of the vehicle (places a higher priority on the imparting of a yaw moment than on deceleration), while a second characteristic (a characteristic for computing target control quantities Bg**) gives more weight to a deceleration characteristic of the vehicle (places a higher priority on the deceleration than on the imparting of the yaw moment).

Based on the first characteristic, the braking forces are distributed to the individual wheels such that the yaw moment that acts toward the inner side of the turning increases and the vehicle's direction of movement becomes more likely to change. In contrast, based on the second characteristic, the braking forces are distributed to the individual wheels such that the sum of the braking forces on the individual wheels reaches a maximum within a range in which a yaw moment that maintains the turning of the vehicle can be ensured, making it possible for the vehicle to decelerate sufficiently.

When the determination result Fg, as determined by the curve traverse possibility determination unit A8 that will be described later, is that it is possible for the vehicle to traverse the curve (when the determination result Fg is one of zero and a relatively small value), the first characteristic is selected as the characteristic for computing the target control quantities Bt. This causes the yaw movement characteristic of the vehicle to increase in a case where the understeer suppression control has been started. On the other hand, when the determination result Fg is that it is not possible for the vehicle to traverse the curve (when the determination result Fg is one of one and a relatively large value), the second characteristic is selected as the characteristic for computing the target control quantities Bt. This causes priority to be placed on the deceleration of the vehicle, such that, in a case where the understeer suppression control has been started, the maximum possible vehicle deceleration is achieved while the turning radius on the curve is maintained.

Based on the target control quantities that are computed by the target control quantity computation unit A4, a control unit A5 decreases the output of the power source and independently controls the braking forces on the individual wheels. Specifically, a wheel brake control unit A52 that controls the braking forces on the individual wheels is controlled based on the target control quantities Bt**. In addition, a power source output control unit A51 that controls the output of the power source (the engine EG or the like) is controlled based on the target output power Ot.

A curve information acquisition unit A6 acquires a curve shape Rc (for example, curve radius of curvature Rc) as curve information that pertains to the curve that lies ahead of the vehicle. At this time, a position Pc that corresponds to the curve radius of curvature Rc can also be acquired as curve information along with the curve radius of curvature Rc. The curve radius of curvature Rc and the position Pc are stored in a map database in the storage portion MAP. The curve information may be stored such that the position Pc (for example, a latitude and a longitude) and the curve radius of curvature Rc at the position Pc are stored directly, and it may also be stored in a format that makes it possible for the position Pc and the curve radius of curvature Rc to be computed.

A vehicle speed acquisition unit A7 acquires the vehicle speed Vx.

Based on the vehicle speed Vx and on the curve shape Rc (particularly the curve radius of curvature Rc) of the curve that lies ahead in the vehicle's direction of travel, the curve traverse possibility determination unit A8 determines whether or not the vehicle can traverse the curve in a stable manner. In concrete terms, the curve traverse possibility determination unit A8 determines the minimum radius of curvature Rm based on the curve shape Rc (the curve radius of curvature Rc), then computes a lateral acceleration Gye ($Vx^2$/Rm) based on the minimum radius of curvature Rm and the current vehicle speed Vx. In this case, the lateral acceleration Gye is equivalent to a maximum value (calculated value) for the lateral acceleration that is generated in a case where the vehicle traverses the curve in question with the vehicle speed Vx remaining constant.

In a case where the lateral acceleration Gye is less than a specified value (for example, 0.8 G), it can be determined that the vehicle can traverse the curve in a stable manner. On the other hand, in a case where the lateral acceleration Gye is not less than the specified value, it can be determined that the vehicle cannot traverse the curve in a stable manner. A constant that is set in advance can be used for the specified value, but a value that is determined based on a road surface friction coefficient μmax can also be used.

The curve traverse possibility determination unit A8 computes the determination value Fg that indicates whether or not the vehicle can traverse the curve, then outputs the determination value Fg to the target control quantity computation unit A4. A value of zero for the determination value Fg indicates that the vehicle can traverse the curve, and a value of one for the determination value Fg indicates that the vehicle cannot traverse the curve. The value of the determination value Fg is not limited to being one of zero and one, but can also be computed as a value that is intermediate between zero and one ($0<Fg<1$).

In the explanation above, the determination of whether or not the vehicle can traverse the curve is made based on the maximum lateral acceleration Gye that it is assumed will act on the vehicle if the curve can be traversed, the lateral acceleration Gye being computed based on the minimum radius of curvature Rm of the curve and on the actual vehicle speed Vx. As described below, the determination as to whether or not the curve can be traversed can also be made by a method that is different from the method described above.

Specifically, a vehicle position acquisition unit A9 is provided that acquires a vehicle position Pvh. The vehicle position Pvh is thus acquired. The vehicle position Pvh is detected using the Global Positioning System (GPS).

In this case, the curve information acquisition unit A6 acquires the curve shape Rc and the position Pc within the curve that corresponds to the curve shape Rc. A target vehicle speed Vt is computed based on the curve shape Rc, the curve position Pc, and the acquired vehicle position Pvh. In concrete terms, an appropriate vehicle speed Vq for traversing the curve in a stable manner is computed based on the curve information items Rc and Pc, and the target vehicle speed Vt at the current vehicle position Pvh is computed based on the appropriate vehicle speed Vq and the vehicle position Pvh. The target vehicle speed Vt and the vehicle speed Vx are compared, and the determination as to whether or not the vehicle can traverse the curve in a stable manner is made based on the result of the comparison.

In a case where the vehicle speed Vx at the vehicle position Pvh is not greater than the target vehicle speed Vt, the determination is made that the vehicle can traverse the curve in a stable manner. On the other hand, in a case where the vehicle speed Vx exceeds the target vehicle speed Vt, the determination is made that the vehicle cannot traverse the curve in a stable manner. In this case as well, in the same manner as described above, the curve traverse possibility determination unit A8 computes the determination value Fg that indicates whether or not the vehicle can traverse the curve, then outputs the determination value Fg to the target control quantity computation unit A4. A value of zero for the determination value Fg indicates that the vehicle can traverse the curve, and a value of one for the determination value Fg indicates that the vehicle cannot traverse the curve. The value of the determination value Fg is not limited to being one of zero and one, but can also be computed as a value that is intermediate between zero and one (0<Fg<1).

Figure 5:
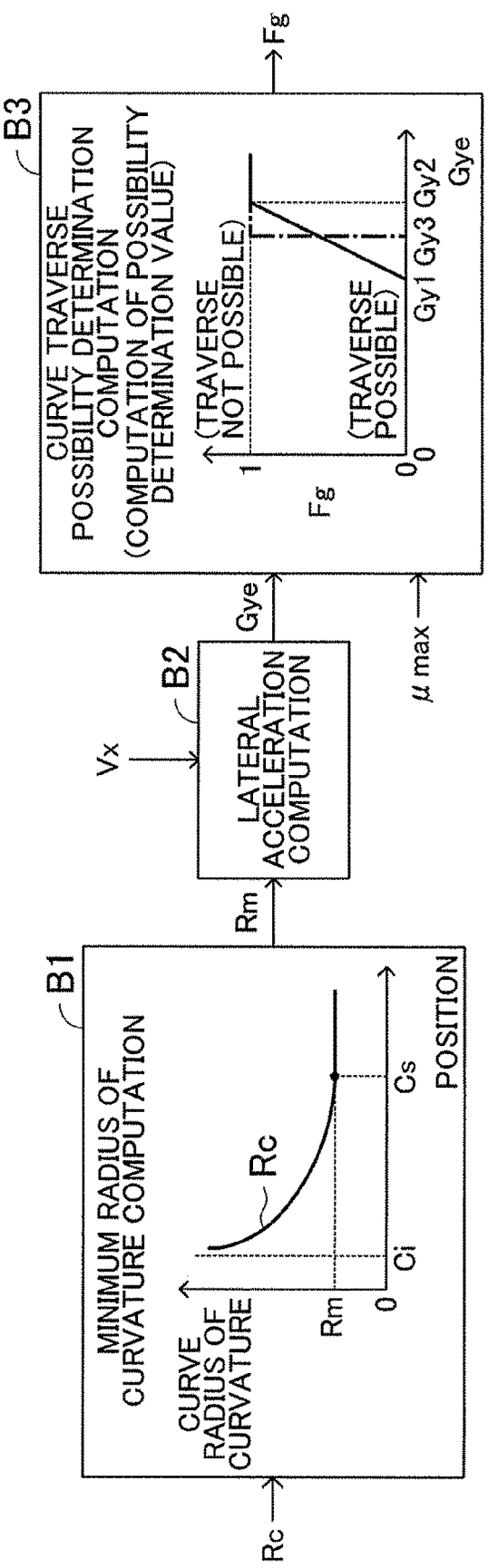
FIG. 5 is a functional block diagram for explaining an example of computation of a curve traverse possibility determination value by a curve traverse possibility determination unit that is shown in FIG. 4.

Example of the computation of the determination value Fg that indicates whether or not the vehicle can traverse the curve Next, an example of the computation, by the curve traverse possibility determination unit A8, of the determination value Fg that indicates whether or not the vehicle can traverse the curve will be explained in detail with reference to FIG. 5. FIG. 5 shows an example in which the determination value Fg is computed using the lateral acceleration Gye.

In a minimum radius of curvature computation block B1, the minimum radius of curvature Rm of the curve is computed based on the curve shape (the curve radius of curvature) Rc of the curve that lies ahead in the vehicle's direction of travel.

In a lateral acceleration computation block B2, the equation below is used to compute the lateral acceleration Gye based on the minimum radius of curvature Rm (the radius of curvature of the fixed radius of curvature section Zit) and the current vehicle speed Vx. In this case, the lateral acceleration Gye is the maximum value for the lateral acceleration that it is assumed will act on the vehicle if the curve can be traversed with the current vehicle speed Vx remaining constant.

$$Gye = Vx^2/Rm$$

In a curve traverse possibility determination computation block B3, the determination value Fg that indicates whether or not the vehicle can traverse the curve in a stable manner is computed based on the lateral acceleration Gye. Specifically, in a case where the lateral acceleration Gye is not greater than a specified value Gy1, the determination value Fg is computed as equal to zero, indicating that the vehicle can traverse the curve in a stable manner. In a case where the lateral acceleration Gye is greater than the specified value Gy1 and less than a specified value Gy2, the determination value Fg is computed such that the determination value Fg increases from zero in accordance with the increase of the lateral acceleration Gye from the specified value Gy1. In a case where the lateral acceleration Gye is not less than the specified value Gy2, the determination value Fg is computed as equal to one, indicating that the vehicle cannot traverse the curve in a stable manner. In a case where the determination value Fg is greater than zero and less than one, the determination value Fg indicates the probability that the vehicle can traverse (cannot traverse) the curve in a stable manner. Specifically, the larger (the closer to one) the determination value Fg is, the lower the probability is that the vehicle can traverse the curve, and the smaller (the closer to zero) the determination value Fg is, the greater the probability is that the vehicle can traverse the curve.

The determination value Fg can also be computed such that it is zero (the curve can be traversed) in a case where the lateral acceleration Gye is not greater than a specified value Gy3, which is indicated by the dashed line in FIG. 5. The determination value Fg can also be computed such that it is one (the curve cannot be traversed) in a case where the lateral acceleration Gye is greater than the specified value Gy3.

It is physically impossible for the vehicle to turn with a lateral acceleration that exceeds the lateral acceleration that is determined based on the coefficient of the friction between the vehicle's tires and the road surface. Therefore, the specified value Gy1 and the specified value Gy3 can be set to approximately 0.8 G in consideration of the coefficient of the friction between the tires and the road surface. It is also possible for the road surface friction coefficient max to be computed and for the specified values Gy1, Gy2, and Gy3 to be adjusted based on the road surface friction coefficient max. In a case where the computed value of the road surface friction coefficient max is small, the specified values Gy1, Gy2, and Gy3 can be adjusted to relatively small values, and in a case where the computed value of the road surface friction coefficient max is large, the specified values Gy1, Gy2, and Gy3 can be adjusted to relatively large values.

Figure 6:
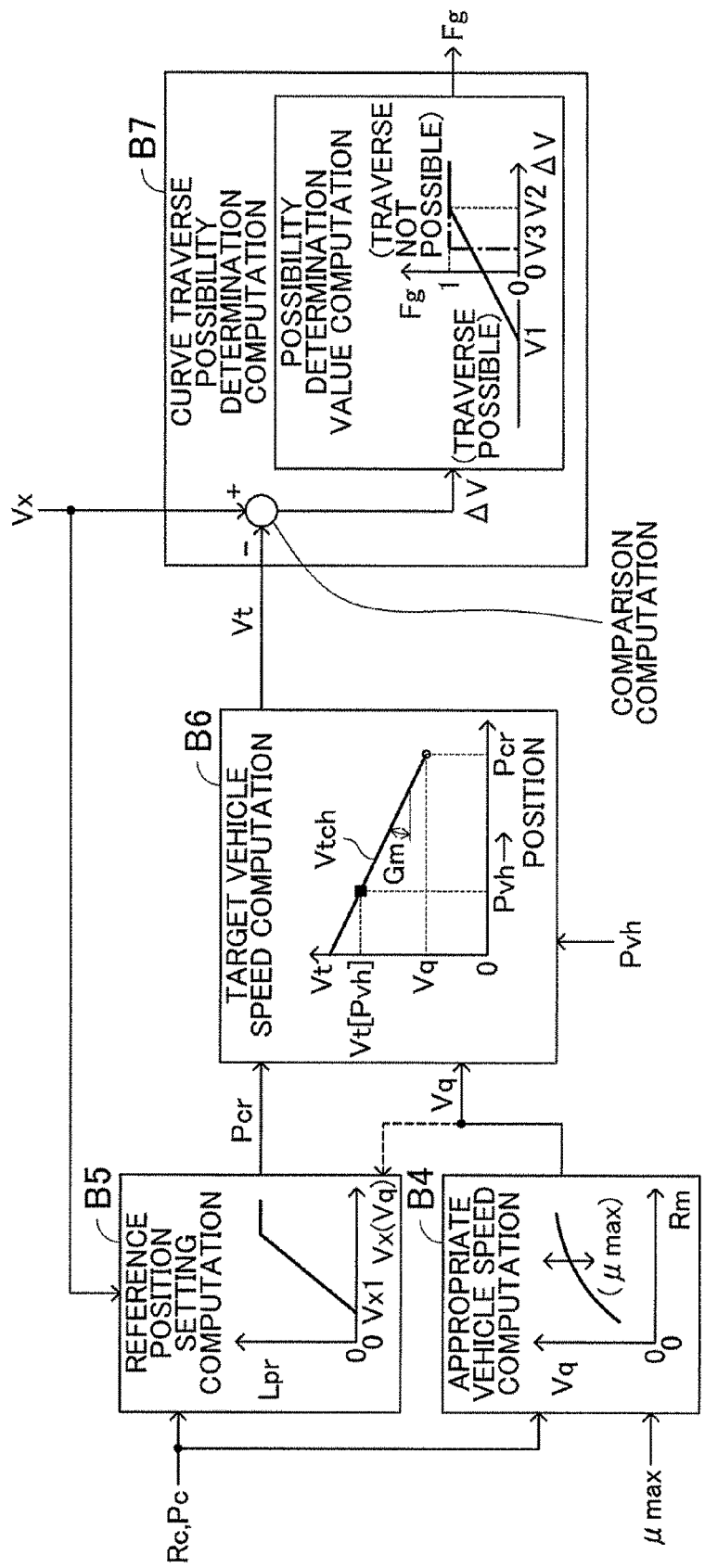
FIG. 6 is a functional block diagram for explaining another example of the computation of the curve traverse possibility determination value by the curve traverse possibility determination unit that is shown in FIG. 4.

Another Example of the Computation of the Determination Value Fg that Indicates Whether or not the Vehicle can Traverse the Curve Next, another example of the computation, by the curve traverse possibility determination unit A8, of the determination value Fg that indicates whether or not the vehicle can traverse the curve will be explained in detail with reference to FIG. 6. FIG. 6 shows an example in which the determination value Fg is computed using the target vehicle speed Vt that was explained above.

In an appropriate vehicle speed computation block B4, the appropriate vehicle speed Vq for traversing the curve in a stable manner is computed based on the aforementioned curve information items Rc and Pc (the curve shape (the curve radius of curvature) Rc and the position Pc). The radius of curvature Ram of the section within the curve (the fixed radius of curvature section Zit) where the radius of curvature is fixed is determined based on the curve information items Rc and Pc. The appropriate vehicle speed Vq is computed based on the radius of curvature Rm. The larger the radius of curvature Rm is, the larger the value is that is computed for the appropriate vehicle speed Vq, and the smaller the radius of curvature Rm is, the smaller the value is that is computed for the appropriate vehicle speed Vq.

The appropriate vehicle speed Vq can also be adjusted based on at least one of an ascending/descending slope Kud, a road width Wrd, a forward visibility Msk, and the vehicle speed Vx. When the ascending/descending slope Kud is a descending slope, the appropriate vehicle speed Vq is adjusted to be less than it would be on a level road, and when the ascending/descending slope Kud is an ascending slope, the appropriate vehicle speed Vq is adjusted to be greater than it would be on a level road. In a case where the road width Wrd is narrow, the appropriate vehicle speed Vq is adjusted to be less than it would be on a wide road, and in a case where the road width Wrd is wide, the appropriate vehicle speed Vq is adjusted to be greater than it would be on a narrow road. In a case where the forward visibility Msk is poor, the appropriate vehicle speed Vq is adjusted to be less than it would be if the visibility were good, and in a case where the forward visibility Msk is good, the appropriate vehicle speed Vq is adjusted to be greater than it would be if the visibility were poor. In a case where the vehicle speed Vx is high, the appropriate vehicle speed Vq is adjusted to be less than it would be if the vehicle speed Vx were low, and in a case where the vehicle speed Vx is low, the appropriate vehicle speed Vq is adjusted to be greater than it would be if the vehicle speed Vx were high.

The appropriate vehicle speed Vq can also be adjusted based on the road surface friction coefficient μmax. When the road surface friction coefficient μmax is high, the appropriate vehicle speed Vq is adjusted to a greater value, and when the road surface friction coefficient μmax is low, the appropriate vehicle speed Vq is adjusted to a lower value.

In a reference position setting computation block 85, a reference point Pcr is determined. The reference point Pcr is a location that serves as a reference for determining whether or not the vehicle can traverse the curve properly, and it is also a location that serves as a target by which the vehicle speed should decrease to the appropriate vehicle speed Vq. The reference point Per can be set at the start point Cs where the radius of curvature of the curve becomes fixed (the point in the fixed radius of curvature section Zit that is closest to the vehicle). The start point Cs where the radius of curvature of the curve reaches its lowest value can also be set as the reference point Per. The start point Cs is determined based on the curve shape Rc and the curve position Pc.

The reference point Per can be set to a point that is closed to the vehicle than one of the start point Cs of the fixed radius of curvature section Zit and the point where the radius of curvature is lowest by a distance Lpr (in the vicinity of the final portion of the gradual curve in the entrance section Zci). The distance Lpr can be set to a fixed value.

The distance Lpr can also be computed according to the vehicle speed Vx. In concrete terms, the distance Lpr can be determined such that, if the vehicle speed Vx is not greater than a specified value Vx1, the distance Lpr is set to zero (that is, the reference point Pcr is the same as the start point Cs), and if the vehicle speed Vx is greater than the specified value Vx1, the distance Lpr increases from zero in accordance with the increase of the vehicle speed Vx from the specified value Vx1. Here, the vehicle speed Vx can be replaced by the appropriate vehicle speed Vq, and the distance Lpr can be determined based on the appropriate vehicle speed Vq.

In this case, the reference point Per is set to a point on the curve that is closer to the curve start point Ci than the start point Cs is by the distance Lpr. In other words, the reference point Per is set based on the distance Lpr, the curve shape Rc, and the start point Cs (the curve position Pc).

As explained above, the reference point Per is the location that serves as the target by which the vehicle speed should decrease to the appropriate vehicle speed Vq. In some cases, the map information and the like contain errors. Setting the reference point Per to a location that is closer to the curve entrance Ci than the start point Cs by the distance Lpr makes it possible to neutralize those errors.

In a target vehicle speed computation block B6, the target vehicle speed Vt is computed. Specifically, a target vehicle speed computation characteristic Vtch for computing the target vehicle speed Vt (Vt[Pvh]) in the vehicle position Pvh is first computed based on the reference point Per and the appropriate vehicle speed Vq. The target vehicle speed computation characteristic Vtch is a characteristic by which the vehicle speed decreases at a rate of deceleration Gm (a pre-set constant, for example) from the curve entrance to the reference point Per such that the vehicle speed reaches the appropriate vehicle speed Vq at the reference point Pcr.

The rate of deceleration Gm can be adjusted based on the road surface friction coefficient μmax. Specifically, when the road surface friction coefficient μmax is large, the rate of deceleration Gm is adjusted to a large value, and when the road surface friction coefficient μmax is small, the rate of deceleration Gm is adjusted to a small value. The target vehicle speed Vt at the vehicle position Pvh is then computed by taking the vehicle position Pvh that is acquired by the vehicle position acquisition unit A9 (the Global Positioning System device GPS) and inputting it to the target vehicle speed computation characteristic Vtch that is determined based on the reference point Per and the appropriate vehicle speed Vq.

In a curve traverse possibility determination computation block B7, the determination value Fg is computed that indicates whether or not the vehicle can traverse the curve that lies ahead in a stable manner. Specifically, the vehicle speed Vx that is acquired by the vehicle speed acquisition unit A7 is compared to the target vehicle speed Vt, and the determination value Fg is computed based on a vehicle speed difference ΔV (Vx−Vt).

In a case where the vehicle speed deviation ΔV is not greater than a specified value V1, the determination value. Fg is computed as equal to zero, indicating that the vehicle can traverse the curve in a stable manner. In a case where the vehicle speed deviation ΔV is greater than a specified value V1 and is less than a specified value V2, the determination value Fg is computed such that the determination value Fg increases from zero in accordance with the increase of ΔV from the specified value V1. In a case where the vehicle speed deviation ΔV is not less than the specified value V2, the determination value Fg is computed as equal to one, indicating that the vehicle cannot traverse the curve in a stable manner. In a case where the determination value Fg is greater than zero and less than one, the determination value Fg indicates the probability that the vehicle can traverse (cannot traverse) the curve in a stable manner. Specifically, the larger (the closer to one) the determination value Fg is, the lower the probability is that the vehicle can traverse the curve, and the smaller (the closer to zero) the determination value Fg is, the greater the probability is that the vehicle can traverse the curve.

The determination value Fg can also be computed such that it is zero (the curve can be traversed) in a case where the vehicle speed deviation ΔV is not greater than a specified value V3, which is indicated by the dashed line in FIG. 6. The determination value Fg can also be computed such that it is one (the curve cannot be traversed) in a case where the vehicle speed deviation ΔV is greater than the specified value V3.

Computation of the Target Control Quantities Bt**

Next, an example of the computation of the target control quantities Bt by the target control quantity computation unit A4 will be explained in detail with reference to FIG. 7**.

In a target turning state quantity computation block B8 (a target yaw rate computation block, corresponding to the target turning state quantity computation unit A2), the target turning state quantity Td is computed that is of the same dimension as that of the actual turning state quantity Ta. For example, in a case where the actual turning state quantity Ta is the actual yaw rate Yr that is detected by the yaw rate sensor YR, the target yaw rate Yrd is computed based on the vehicle speed Vx and on one of the steering wheel angle θsw and the steering control wheel steering angle δf.

In a comparison computation block B9 (a steering characteristics computation block, corresponding to the steering characteristics computation unit A3), the target turning state quantity Td and the actual turning state quantity Ta are compared, and the steering characteristic value Sch (Td−Ta) is computed. The steering characteristic value Sch is a value that expresses a measure of the vehicle's steering characteristics (understeer, oversteer). In a case where the steering characteristic value Sch is roughly zero, the vehicle is in a state of neutral steer. In a case where the steering characteristic value Sch is less than zero, the vehicle is in a state of oversteer, and the greater the absolute value of the steering characteristic value Sch is, the greater is the degree of the oversteer. In contrast, in a case where the steering characteristic value Sch is greater than zero, the vehicle is in a state of understeer, and the greater the steering characteristic value Sch is, the greater is the degree of the understeer.

For example, in a case where the steering characteristic value Sch indicates the yaw rate, the target yaw rate Yrd and the actual yaw rate Yr are compared, and a yaw rate deviation ΔYr (Yrd−Yr) is output that indicates the steering characteristics of the vehicle (understeer, oversteer, or the like). In a case where the yaw rate deviation ΔYr is roughly zero, the vehicle is in a state of neutral steer. In a case where ΔYr is less than zero, the vehicle is in a state of oversteer, and the greater the absolute value of ΔYr is, the greater is the degree of the oversteer. On the other hand, in a case where ΔYr is greater than zero, the vehicle is in a state of understeer, and the greater ΔYr is, the greater is the degree of the understeer.

In a case where the vehicle is in a state of oversteer, the steering characteristic value Sch (for example, the yaw rate deviation ΔYr) is input to a target control quantity computation block B10 of a known oversteer suppression control. In contrast, in a case where the vehicle is in a state of understeer, the steering characteristic value Sch (for example, the yaw rate deviation ΔYr) is input to a target control quantity computation block B11 of the understeer suppression control according to the present invention. The target control quantity computation block B11 corresponds to a portion of the target control quantity computation unit A4.

In a control start threshold value computation block B12 within the target control quantity computation block B11, the threshold value Kj is computed based on the determination result (the determination value) Fg that was described previously. In a case where the determination result Fg is not greater than a specified value F1 (that is greater than zero and less than 1), the threshold value Kj is set to a specified value K2. The specified value K2 is a value that is ordinarily set as a default value (an initial value). Further, in a case where the determination result Fg is not less than a specified value F2 (that is greater than F1 and less than one), the threshold value Kj is set to a specified value K1 (that is less than K2). In a case where the determination result Fg is greater than the specified value F1 and less than the specified value F2, the threshold value Kj is set to a value that becomes smaller as the determination result Fg becomes greater.

Figure 7:
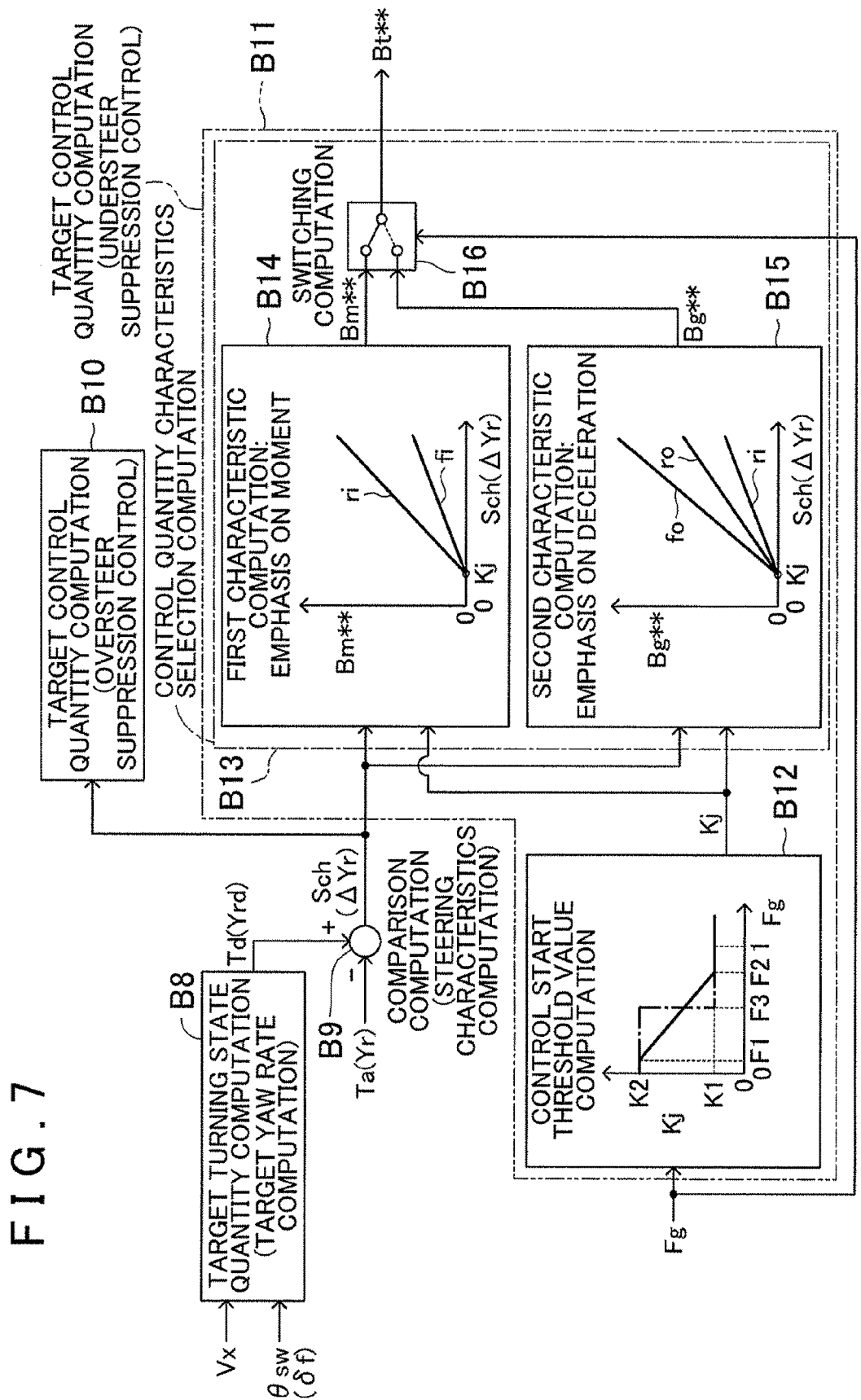
FIG. 7 is a functional block diagram for explaining an example of computation of a target control quantity by a target control quantity computation unit that is shown in FIG. 4.

Moreover, in a case where the determination result Fg is not greater than a specified value F3, as indicated by the dashed line in FIG. 7, the threshold value Kj can be set to K2, and in a case where the determination result Fg is greater than a specified value F3, the threshold value Kj can be set to K1 (less than K2).

As explained above, in a case where it is determined that the vehicle can traverse the curve appropriately, the threshold value Kj is set to a large value (the ordinary default value K2). On the other hand, in a case where it is determined that the vehicle cannot traverse the curve appropriately, the threshold value Kj is adjusted to a relatively small value. This makes it more likely that the understeer suppression control will be started.

The threshold value Kj that has been computed in this way based on the determination result Fg is output to a control quantity characteristics selection computation block B13 within the target control quantity computation block B11. The control quantity characteristics selection computation block B13 contains two computation blocks. In a first characteristic computation block B14 (the first characteristic being the characteristic that gives more weight to the yaw moment), the braking forces are distributed to the individual wheels such that the yaw moment that acts toward the inner side of the turning increases and the vehicle's direction of movement becomes more likely to change. In a second characteristic computation block B15 (the second characteristic being the characteristic that gives more weight to the rate of deceleration), the braking forces are distributed to the individual wheels such that the sum of the braking forces on the individual wheels reaches a maximum within a range in which the yaw moment that maintains the turning of the vehicle can be ensured, making it possible for the vehicle to decelerate sufficiently. Control start threshold values for the first and the second characteristics are set based on the threshold value Kj. In the present example, the control start threshold values for the first and the second characteristics are both set to a value that is equal to the threshold value Kj.

The first characteristic is used to compute the target control quantities Bm, which give more weight to the yaw characteristic of the vehicle (place a higher priority on the imparting of the yaw moment than on deceleration), based on the steering characteristic value Sch (for example, the yaw rate deviation ΔYr). In order to increase the yaw moment that acts toward the inner side of the turning, the target control quantities Bm are computed such that the target control quantity Bm* for the rear wheel on the inner side of the turning (indicated by "ri" in FIG. 7) increases in accordance with an increase in the steering characteristic value Sch (for example, the yaw rate deviation ΔYr). The target control quantities Bm are also computed such that the target control quantity Bm for the front wheel on the inner side of the turning (indicated by "fi" in FIG. 7) increases in accordance with an increase in the steering characteristic value Sch (for example, the yaw rate deviation ΔYr). The first characteristic is ordinarily set as a default characteristic (an initial characteristic).

The second characteristic is used to compute the target control quantities Bg, which give more weight to the deceleration characteristic of the vehicle (place a higher priority on the deceleration than on the imparting of the yaw moment), based on the steering characteristic value Sch (for example, the yaw rate deviation ΔYr). In order to increase the rate of deceleration while maintaining the yaw moment of the vehicle, the target control quantities Bg are computed such that the target control quantities Bg** for the front wheel on the outer side of the turning (indicated by "fo" in FIG. 7), the rear wheel on the outer side of the turning (indicated by "ro" in FIG. 7), and the rear wheel on the inner side of the turning (indicated by "ri" in FIG. 7) increase in accordance with an increase in the yaw rate deviation ΔYr.

In a switching computation block B16 within the target control quantity computation block B11, one of the target control quantities Bm and the target control quantities Bg is selected for the final target control quantities Bt, based on the determination result Fg. In concrete terms, in a case where the determination result Fg is one of zero and not greater than a specified value F0, that is, in a case where it has been determined that the vehicle can traverse the curve that lies ahead in a stable manner (or that the probability of traversing the curve is high), the target control quantities Bm are selected as the target control quantities Bt. On the other hand, in a case where the determination result Fg is one of one and greater than the specified value F0, that is, in a case where it has been determined that the vehicle cannot traverse the curve that lies ahead in a stable manner (or that the probability of traversing the curve is low), the target control quantities Bg are selected as the target control quantities Bt**.

Thus, in a case where it has been determined that the vehicle cannot traverse the curve that lies ahead in a stable manner (or that the probability of traversing the curve is low), the characteristic that is used to compute the target control quantities is changed from the first characteristic to the second characteristic. Therefore, the understeer suppression control is more likely to start, and the characteristic is changed to one that makes it possible to achieve a higher rate of deceleration. It therefore becomes possible for the vehicle to traverse the curve in a stable manner.

Wheel Brake Control Based on the Target Control Quantities Bt**

Figure 8:
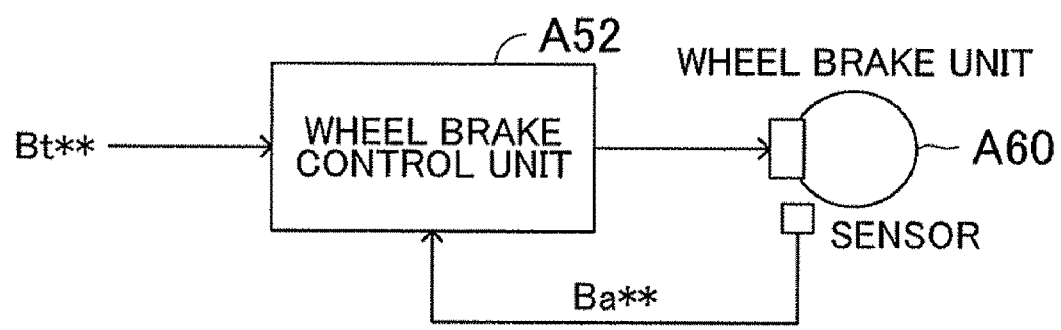
FIG. 8 is a functional block diagram for explaining wheel brake control by a wheel brake control unit of a control unit that is shown in FIG. 4.

Next, the wheel brake control by the wheel brake control unit A52 of the control unit A5 will be explained in detail with reference to FIG. 8.

The wheel brake control unit A52 controls a wheel brake unit A60 based on the target control quantities Bt**. A known unit that controls the braking pressure, such as an electric motor, a pump, a solenoid valve, or the like, for example, can be used as the wheel brake control unit A52. A known unit, such as a brake caliper, a rotor, a pad, or the like, for example, can be used as the wheel brake unit A60.

In one of the wheel brake unit A60 and the wheel brake control unit A52, a sensor is provided that detects an actual value that corresponds to the target control quantities Bt. For example, a wheel speed sensor may be provided in a case where the target control quantities Bt indicate wheel slip quantities, a pressure sensor may be provided in a case where braking pressures are indicated, and a torque sensor may be provided in a case where braking torques are indicated. The braking forces (the braking torques) for the individual wheels are controlled by the wheel brake control unit A52, based on the target control quantities Bt and on actual control quantities Ba that are detected by the sensor.

According to the vehicle stabilization control device according to the present embodiment of the present invention, as explained above, the probability that the vehicle can traverse the curve in a stable manner (the determination result Fg) is determined at around the time that the vehicle enters the curve, based on the current vehicle speed Vx and on the curve information item (the curve shape) Rc that is based on the map information that is stored in the storage portion MAP of the navigation device NAV. In a case where it has been determined that the vehicle can traverse the curve appropriately (the determination result Fg equals zero), the threshold value Kj for starting the understeer suppression control is set to a large value (the default value K2), and the first characteristic (the default characteristic, B) for distributing the braking forces to the individual wheels is selected, such that more weight is given to the yaw characteristic of the vehicle (higher priority is placed on the imparting of the yaw moment than on deceleration). This makes it less likely that the understeer suppression control will start, such that the understeer suppression control is inhibited from starting unnecessarily at frequent intervals. Furthermore, after the understeer suppression control starts, the yaw movement characteristic of the vehicle increases, and the understeer can be effectively suppressed.

In contrast, in a case where it has been determined that the vehicle cannot traverse the curve appropriately (the determination result FIG equals one), the threshold value Kj for starting the understeer suppression control is set to a relatively small value (K1), and the second characteristic (Bg**) for distributing the braking forces to the individual wheels is selected, such that more weight is given to the deceleration characteristic of the vehicle (higher priority is placed on the deceleration than on the imparting of the yaw moment). This makes it more likely that the understeer suppression control will start in a case where it has been determined that the vehicle cannot traverse the curve appropriately, and after the understeer suppression control starts, a greater rate of deceleration can be achieved. The vehicle can therefore be decelerated effectively, making it possible for the vehicle to traverse the curve in a stable manner.

The present invention is not limited to the embodiment that is described above, and various types of modified examples can be used within the scope of the present invention. For example, in the embodiment that is described above, it is assumed that the curve information is accurate. However, it may happen that, once the curve information is stored in the map database, the map database is not updated even though the shape of the road is altered by road improvements and the like. Cases therefore occur in which the accuracy of the curve traverse possibility determination is diminished.

Figure 9:
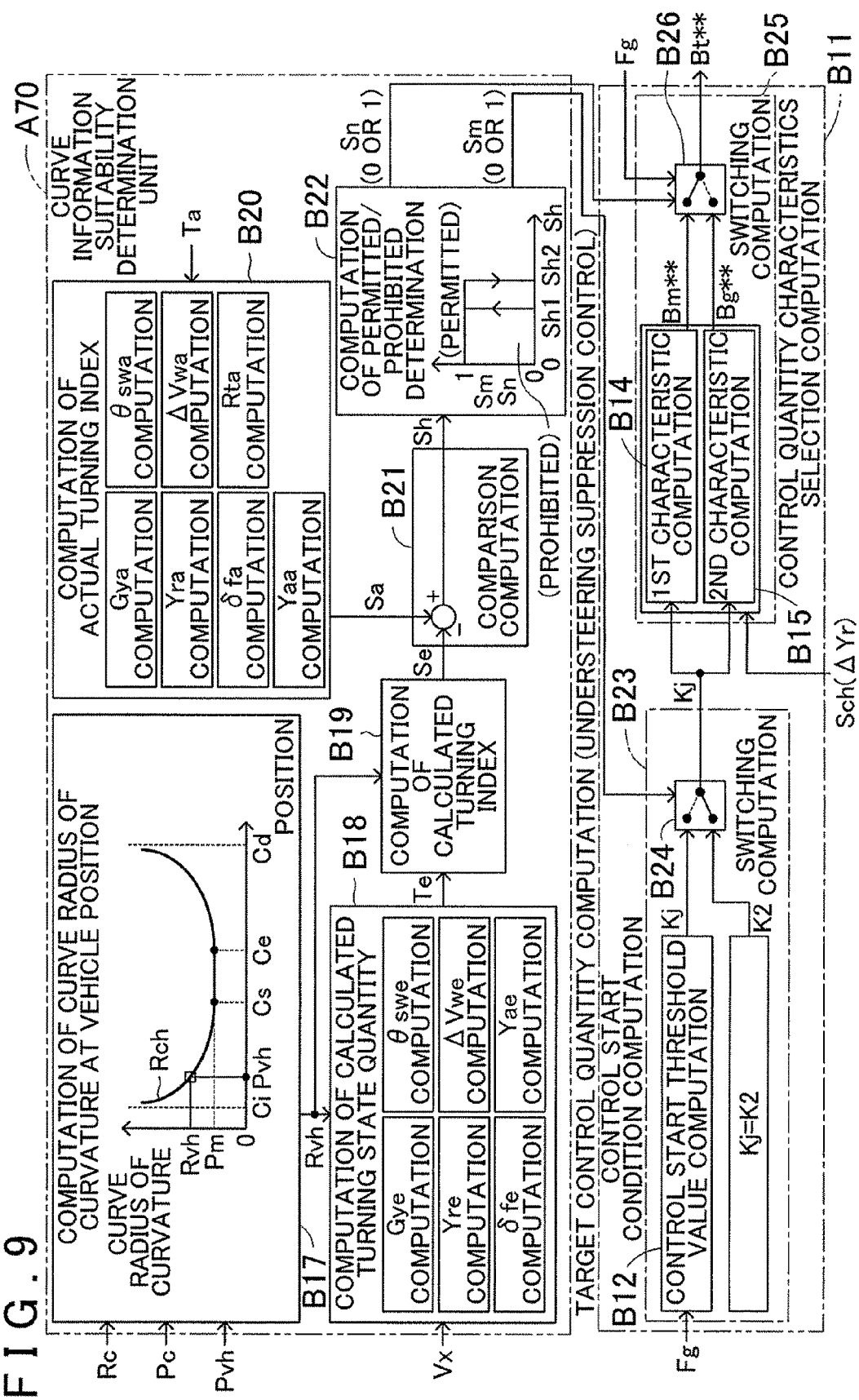
FIG. 9 is a functional block diagram for explaining an example of processing by the vehicle stabilization control device according to the modified embodiment of the present invention that determines whether or not to use curve information, adjusts a threshold value, and switches characteristics that are used to compute target control quantity.

Accordingly, in order to improve the accuracy of the curve traverse possibility determination, it is desirable for the curve information (radius of curvature of the curve) to be evaluated based on the actual turning state quantity Ta of the vehicle, and for the adjusting of the threshold value Kj and the switching of the computed characteristics (Bm, Bg) for the target control quantities Bt (in which the appended "" denotes the wheel to which the symbol pertains, with "fl" denoting the left front wheel, "fr" denoting the right front wheel, "rl" denoting the left rear wheel, and "rr" denoting the right rear wheel) to be performed only in a case where the curve information is deemed suitable. (Hereinafter, the adjusting of the threshold value Kj and the switching of the target control quantities Bt** are called "control parameter adjustments".) This case will be explained in detail below with reference to FIG. 9.

In a curve radius of curvature computation block B17, the radius of curvature of the curve at the vehicle position Pvh is computed. In concrete terms, first, a relationship (a radius of curvature computation characteristic) Rch between the position Pc within the curve and the curve radius of curvature Rc is computed based on the curve information items Rc and Pc. The radius of curvature computation characteristic Rch can be estimated based on a curve that is derived by smoothly connecting the positions of a plurality of points (node points) on the road geometrically, the node points being stored in advance (refer to Japanese Patent No. 3378490, for example). Alternatively, the radius of curvature computation characteristic Rch can be a function that expresses a gradual curve (for example, a clothoid curve), a parameter, or the like that is stored in the map information database.

A radius of curvature Rvh of the curve at the vehicle position Pvh is computed based on the radius of curvature computation characteristic Rch. That is, the radius of curvature Rvh of the curve at the vehicle position Pvh is computed by inputting the vehicle position Pvh to the radius of curvature computation characteristic Rch.

In a calculated turning state quantity computation block B18, a calculated turning state quantity Te is computed based on the computed radius of curvature Rvh. Any of the state quantities below can be computed as the turning state quantity Te.

Calculated lateral acceleration $Gye = Vx^2/Rvh$

Calculated yaw rate $Yre = Vx/Rvh$

Calculated steering angle $\delta fe = [L \cdot (1 + Kh \cdot Vx^2)]/Rvh$

Calculated steering wheel angle $\theta swe = [SG \cdot L \cdot (1 + Kh \cdot Vx^2)]/Rvh$ Calculated wheel speed deviation $\Delta Vwe = (Tr \cdot Vx)/Rvh$ Calculated heading angle Yae (the tangential projection of the curve at the vehicle position Pvh in relation to the direction of the straight line portion of the road before the entrance to the curve)

Here, Kh is a stability factor, L is the wheel base of the vehicle, Tr is the tread of the vehicle, and SG is steering gear ratio of the vehicle.

In a calculated turning index computation block B19, a calculated turning index Se is computed based on the calculated turning state quantity Te. The radius of curvature Rvh of the curve that is computed as described above can itself be used as the calculated turning index Se. Moreover, the calculated turning index Se can be computed based on a combination of at least two of the forms of the calculated turning state quantity Te described above.

In an actual turning index computation block B20, an actual turning index Sa is computed based on the actual turning state quantity Ta. The physical quantities (the state quantities) that are computed for the actual turning index Sa and the calculated turning index Se are the same (of the same dimension). For example, in a case where the calculated turning index Se is the radius of curvature Rvh of the curve, a radius of curvature Rta of the curve is computed as the actual turning index Sa that corresponds to the calculated turning index Se, based on the actual turning state quantity Ta. The value of Rta can be driven by any one of the computations listed below.

$$Rta = Vx^2/Gya$$

$$Rta = Vx/Yra$$

$$Rta = [L \cdot (1 + Kh \cdot Vx^2)]/\delta fa$$

$$Rta = [SG \cdot L \cdot (1 + Kh \cdot Vx^2)]/\theta swa$$

Here, Kh is a stability factor, L is the wheel base of the vehicle, and SG is steering gear ratio of the vehicle.

In a comparison computation block B21, the calculated turning index Se and the actual turning index Sa are compared. The absolute value of the deviation between the actual turning index Sa and the calculated turning index Se (a turning index deviation) is used as a comparison result Sh.

In a permitted/prohibited determination computation block B22, a determination is made as to whether or not the control parameter adjustments described above will be permitted, based on the turning index deviation Sh.

Specifically, in a case where the turning index deviation Sh is not greater than a specified value Sh1, it is determined that the curve information is suitable, and a value of "1" (adjustments permitted) is output to control flags Sm and Sn. This causes the control parameter adjustments to be performed. On the other hand, in a case where the deviation Sh is greater than the specified value Sh1, it is determined that the curve information is not suitable, and a value of "0" (adjustments prohibited) is output to the control flags Sm and Sn. This causes the performance of the control parameter adjustments to be prohibited. Here, Sm and Sn are the control flags that indicate whether the performance of the control parameter adjustments is permitted or prohibited, with a value of "0" indicating that the adjustments are prohibited and a value of "1" indicating that the adjustments are permitted.

In a case where the performance of the control parameter adjustments has already been permitted, then in a case where the deviation Sh is not greater than a specified value Sh2, it is determined that the curve information is suitable, and a value of "1" (adjustments permitted) is output to the control flags Sm and Sn. This causes the performance of the control parameter adjustments to be permitted continuously. On the other hand, in a case where the deviation Sh is greater than the specified value Sh2, it is determined that the curve information is not suitable, and a value of "0" (adjustments prohibited) is output to the control flags Sm and Sn. This causes the performance of the control parameter adjustments to be prohibited.

From the permitted/prohibited determination computation block B22, the control flag Sm is output to a threshold value Kj switching computation block B24 within the target control quantity computation block B11. The control flag Sn is output to a control quantity switching computation block B26 within a control quantity characteristics selection computation block B25 within the target control quantity computation block B11.

In the threshold value Kj switching computation block 1324, the default value K2 is selected for the threshold value Kj when the control flag Sm is set to "0" (prohibited), and when the control flag Sm is set to "1" (permitted), the threshold value Kj is selected that is computed by the control start threshold value computation block 1312 (refer to FIG. 7) based on the determination result Fg. The selected threshold value Kj is then output to the control quantity characteristics selection computation block B25.

In the control quantity switching computation block 1326, the first characteristic (the default characteristic, the characteristic that gives more weight to the yaw moment) is selected when the control flag Sn is set to "0" (prohibited), and when the control flag Sn is set to "1" (permitted), the characteristic that is selected based on the determination result Fg is selected.

The suitability of the curve information that is obtained from the map information and the like can thus be checked by comparing the actual turning index Sa, which is computed based on the actual turning state quantity Ta, and the calculated turning index Se, which is computed based on the calculated turning state quantity Te that is computed based on the curve information items Rc and Pc. Only in a case where the curve information is suitable (a case where the control flags Sm and Sn are both set to "1") the control parameter adjustments (specifically, the adjustment of the threshold value Kj and the switching of the computation characteristics for the target control quantities Bt**) are permitted. Therefore, in a case where the curve information is not suitable, it is possible to inhibit the occurrence of a situation in which the control parameter adjustments are performed and the vehicle is decelerated unnecessarily.

Figure 10:
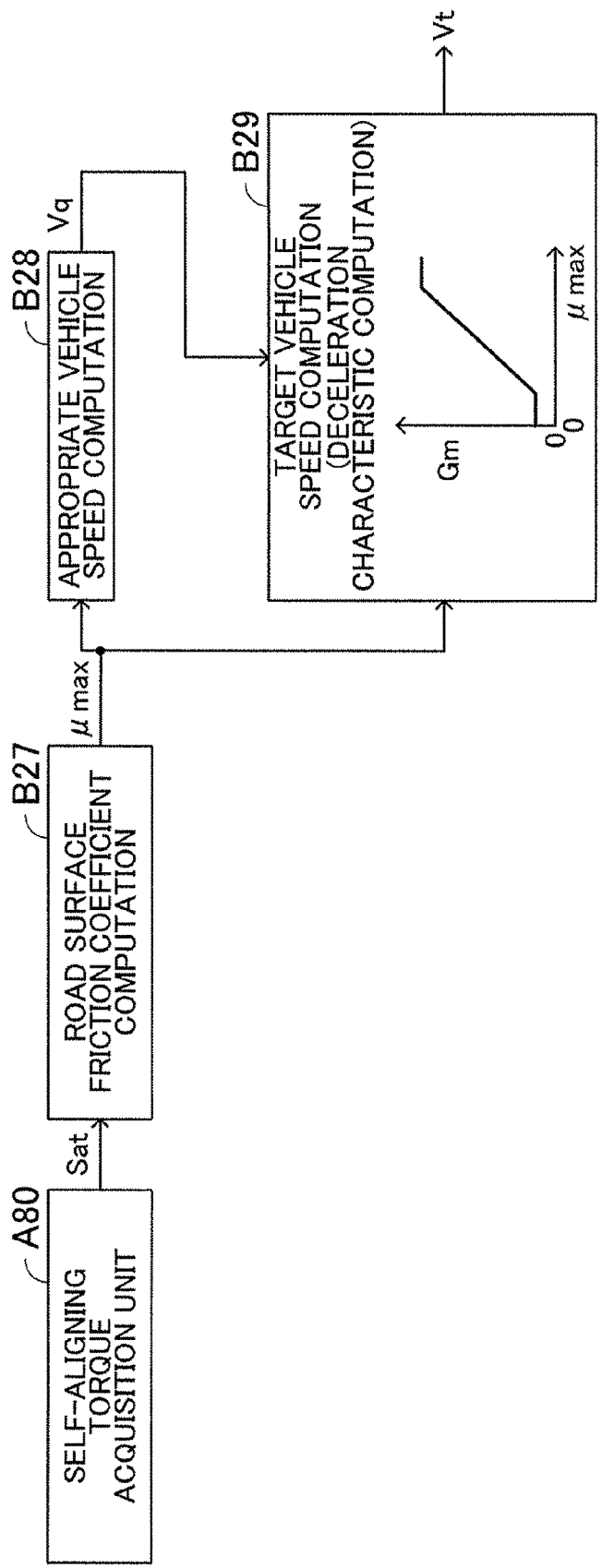
FIG. 10 is a functional block diagram for explaining an example of processing by the vehicle stabilization control device according to the modified embodiment of the present invention in a case where a road surface friction coefficient is computed in accordance with a self-aligning torque.

Further, in the embodiment that is described above, in a road surface friction coefficient computation block B27, as shown in FIG. 10, the road surface friction coefficient μmax can be computed based on a self-aligning torque Sat of the wheels that is acquired by a self-aligning torque acquisition unit A80 (the self-aligning torque sensors ATf*).

The self-aligning torque Sat increases in the process by which the lateral force on the wheels increases. In this process, the self-aligning torque Sat reaches a maximum value before the lateral force achieves a state of saturation (that is, a turning limit state). The road surface friction coefficient μmax can therefore be computed before the turning of the vehicle reaches its limit.

The detection of the self-aligning torque Sat can be accomplished by using one of the known methods that are described in Japanese Patent Application Publication No. JP-A-2008-24073, Japanese Patent Application Publication No. JP-A-2007-245901, Japanese Patent Application Publication No. JP-A-2004-233331, and the like, for example. Furthermore the computation of the road surface friction coefficient μmax based on the self-aligning torque Sat can be accomplished by using one of the known methods that are described in Japanese Patent Application Publication No. JP-A-2007-245901 and the like, for example.

In the road surface friction coefficient computation block B27, the road surface friction coefficient μmax is computed based on the acquired self-aligning torque Sat. The road surface friction coefficient μmax is used by a computation of the appropriate vehicle speed Vq (refer to FIG. 6) in an appropriate vehicle speed computation block B28 and by a computation of the deceleration characteristic (the rate of deceleration) Gm (refer to FIG. 6) in a target vehicle speed computation block B29.

What is claimed is:

1. A vehicle stabilization control device comprising:
   an actual turning state quantity acquisition unit that acquires an actual turning state quantity that indicates an actual turning state of a vehicle;
   a control quantity computation unit that, in order to control a braking force for each of the wheels of the vehicle such that understeer of the vehicle is suppressed, in yaw priority mode, computes a target control quantity for each of the wheels, based on the actual turning state quantity and on a first computation characteristic giving higher priority to an imparting of a yaw moment to the vehicle than to a deceleration of the vehicle or, in a deceleration priority mode, based on the actual turning state quantity and on a second computation characteristic giving higher priority to the deceleration than to the imparting of the yaw moment to the vehicle;
   a control unit that controls the braking force for each of the wheels, based on the target control quantity for each of the wheels;
   a curve information acquisition unit that acquires a shape of a curve that lies ahead in the direction of travel of the vehicle;
   a vehicle speed acquisition unit that acquires a speed of the vehicle; and
   a curve traverse possibility determination unit that determines a possibility that the vehicle can traverse the curve in a stable manner, based on the curve shape and the speed of the vehicle, wherein
   curve information acquisition unit when the possibility that the vehicle can traverse the curve in a stable manner is determined to be high and in the deceleration priority mode when the possibility that the vehicle can traverse the curve in a stable manner is determined to be low.

2. The vehicle stabilization control device according to claim 1, wherein
   the curve traverse possibility determination unit is configured so as to computed a lateral acceleration that acts on the vehicle based on the curve shape and the speed of the vehicle, and to determine the possibility that the vehicle can traverse the curve in a stable manner based on the lateral acceleration.

3. The vehicle stabilization control device according to claim 2, wherein
   the curve traverse possibility determination unit is configured so as to determine;
   that the vehicle can traverse the curve in a stable manner, in a case where the computed lateral acceleration is not greater than a first specified value;
   the possibility that the vehicle can traverse the curve in a stable manner becomes lower to the extent that the deviation between the computed lateral acceleration and the first specified value becomes greater, in a case where the computed lateral acceleration is greater than the first specified value; and
   that the vehicle cannot traverse the curve in a stable manner, in a case where the computed lateral acceleration is not less than a second specified value that is greater than the first specified value.

4. The vehicle stabilization control device according to claim 2, wherein
   the curve traverse possibility determination unit is configured so as to determine;
   that the vehicle can traverse the curve in a stable manner, in a case where the computed lateral acceleration is not greater than a third specified value; and
   that the vehicle cannot traverse the curve in a stable manner, in a case where the computed lateral acceleration is greater than the third specified value.

5. The vehicle stabilization control device according to claim 1, wherein
   the curve information acquisition unit is configured so as to acquire a position within the curve that corresponds to the curve shape,
   the vehicle stabilization control device further comprising:
   a vehicle position acquisition unit that acquires a position of the vehicle; and
   a target vehicle speed computation unit that computes a target vehicle speed for the vehicle to traverse the curve in a stable manner, based on the position that corresponds to the curve shape, the curve shape, and the vehicle position, wherein
   the curve traverse possibility determination unit is configured so as to determine the possibility that the vehicle can traverse the curve in a stable manner based on a result of a comparison of the target vehicle speed and the speed of the vehicle.

6. The vehicle stabilization control device according to claim 5, wherein
   the curve traverse possibility determination unit is configured so as to determine;
   that the vehicle can traverse the curve in a stable manner, in a case where a vehicle speed deviation that is computed by subtracting the target vehicle speed from the speed of the vehicle is not greater than a fourth specified value;
   the possibility that the vehicle can traverse the curve in a stable manner becomes lower to the extent that the vehicle speed deviation becomes greater, in a case where the vehicle speed deviation is greater than the fourth specified value; and
   that the vehicle cannot traverse the curve in a stable manner, in a case where the vehicle speed deviation is not less than a fifth specified value that is greater than the fourth specified value.

7. The vehicle stabilization control device according to claim 5, wherein
   the curve traverse possibility determination unit is configured so as to determine;
   that the vehicle can traverse the curve in a stable manner, in a case where a vehicle speed deviation that is computed by subtracting the target vehicle speed from the speed of the vehicle is not greater than a sixth specified value; and
   that the vehicle cannot traverse the curve in a stable manner, in a case where the vehicle speed deviation is greater than the sixth specified value.

8. The vehicle stabilization control device according to claim 1, further comprising:
- a steering angle acquisition unit that acquires a value that is equivalent to a steering angle of a steering control wheel of the vehicle;
- a target turning state quantity computation unit that computes, based on the speed of the vehicle and the value that is equivalent to the steering angle, a target turning state quantity that corresponds to the actual turning state quantity; and
- a steering characteristics computation unit that, by comparing the target turning state quantity and the actual turning state quantity, computes a steering characteristic value that indicates a steering characteristic of the vehicle, wherein
- the control quantity computation unit is configured so as to compute;
- the target control quantity for each of the wheels to be zero, in a case where the steering characteristic value is not greater than a threshold value;
- the target control quantity for each of the wheels is computed to be greater than zero, in a case where the steering characteristic value is greater than the threshold value; and
- the threshold value to be lower as the possibility that the vehicle can traverse the curve in a stable manner is lower.

9. The vehicle stabilization control device according to claim 1 further comprising:
- a curve information suitability determination unit which computes an actual turning index based on the acquired actual turning state quantity, computes a calculated turning index based on curve information items acquired by the curve information acquisition unit, compares the actual turning index with the calculated turning index to determine the suitability of the acquired curve information items and, when the curve information items are determined to be suitable, permits switching between computation by the curve information acquisition unit in the yaw priority mode and in the deceleration priority mode.

10. The vehicle stabilization control device according to claim 1 wherein the curve traverse possibility determination compares the determined possibility that the vehicle can traverse the curve in a stable manner against a threshold value to determine if the possibility is high or low.

11. The vehicle stabilization control device according to claim 1 wherein the yaw priority mode is set as a default mode.

* * * * *

UNITED STATES PATENT AND TRADEMARK OFFICE
CERTIFICATE OF CORRECTION

PATENT NO.         : 8,224,526 B2
APPLICATION NO.    : 12/570722
DATED              : July 17, 2012
INVENTOR(S)        : Takayuki Miyajima et al.

It is certified that error appears in the above-identified patent and that said Letters Patent is hereby corrected as shown below:

Column 21, line 53 (claim 2, line 4), replace "computed" with --compute--.

Column 21, line 61 (claim 3, line 4), after "determine", delete the ";" and replace with a --:--.

Column 22, line 11 (claim 4, line 4), after "determine", remove the ";" and replace with a --:--.

Column 22, line 41 (claim 6, line 4), after "determine", remove the ";" and replace with a --:--.

Column 22, line 39 (claim 7, line 4), after "determine", remove the ";" and replace with a --:--.

Column 23, line 17 (claim 8, line 17), after "compute", delete the ";" and replace with a --:--.

Signed and Sealed this
Eleventh Day of September, 2012

David J. Kappos
*Director of the United States Patent and Trademark Office*